UNITED STATES PATENT OFFICE.

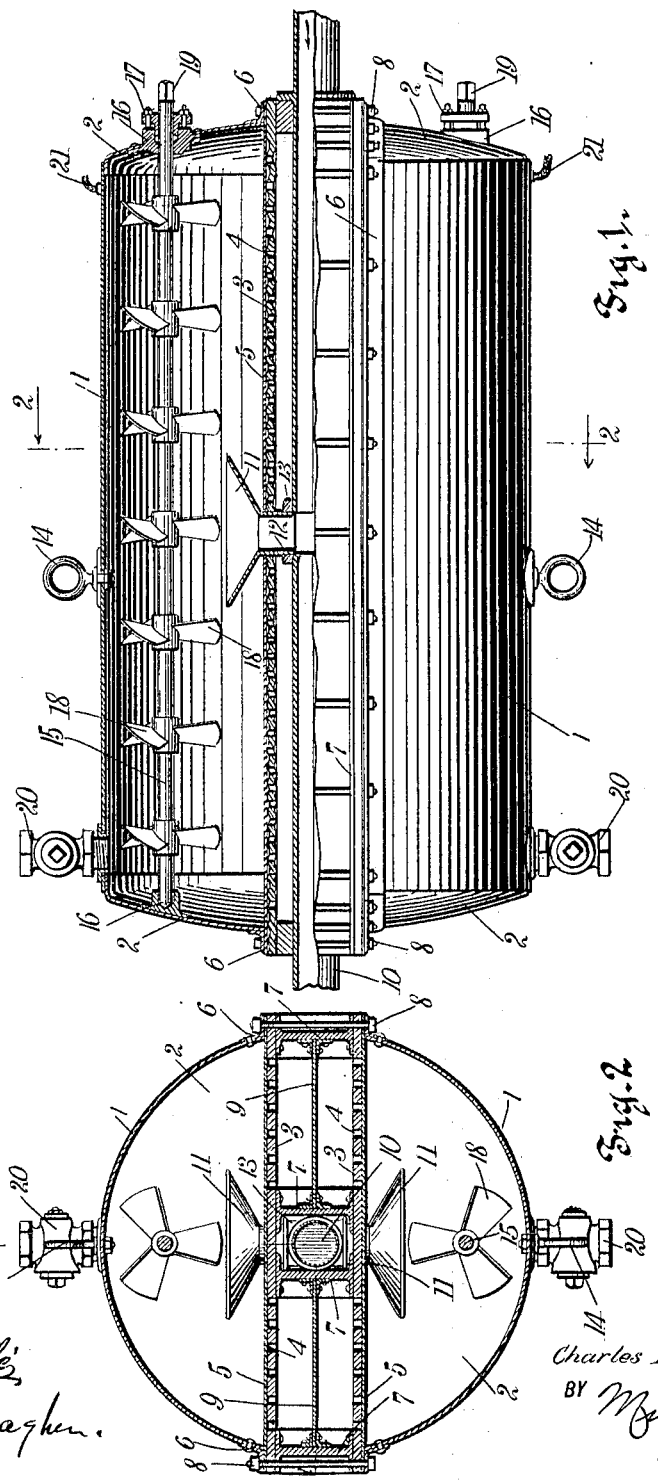

CHARLES EDWIN BALLOW, OF LOS ANGELES, CALIFORNIA.

FILTER.

1,048,384.  Specification of Letters Patent.  Patented Dec. 24, 1912.

Application filed March 2, 1912. Serial No. 681,019.

*To all whom it may concern:*

Be it known that I, CHARLES E. BALLOW, a citizen of the United States, and a resident of Los Angeles, in the county of Los Angeles and State of California, have invented a new and Improved Filter, of which the following is a full, clear, and exact description.

My invention relates generally to filters and more particularly it is directed to a cylinder filter especially adapted to be used as a vacuum filter or a pressure filter.

The principal object of my invention is to provide a cylinder filter having means thereon for rotatably mounting it in position whereby the device is capable of manual operation, thereby being adapted for use in places where such an outfit is desirable but where power is unavailable.

A further object of the invention is to provide a cylindrical filter having a plurality of filtering surfaces therein, together with means for feeding the pulp or other material to the filter, suitable means being provided whereby the material therein may be broken up.

The apparatus is adapted for use with compressed air whereby the filtering is facilitated and is equally well adapted for use with an exhausting device whereby the pressure therein may be lowered, which also tends to further the filtering process.

Other objects and advantages of the invention will appear as the description thereof proceeds, all of which is particularly pointed out and included in the appended claims.

Reference is to be had to the accompanying drawings forming a part of this specification in which similar characters of reference denote corresponding parts in all the views, and in which—

Figure 1 is a side view, partly in section, of the filter; Fig. 2 is a vertical sectional view thereof on the line 2—2 of Fig. 1.

As shown in the drawings, the filter as a whole is shaped like a cylinder and is made up preferably of two separate parts of similar design suitably held together, the construction and arrangement being as follows:

A semi-cylindrical shell 1 is closed at its ends by suitable convex closure members 2, the parts being joined in any suitable manner whereby a trough-like structure is produced, the open side of which is provided with a corrugated or perforated board 3 provided with a number of openings 4 therein, the board being adapted to support a suitable filter cloth 5 made of canvas or any other desirable material, the cloth extending entirely over the board and beyond the sides of the shell 1. Each end member 2 and each side of the shell 1 is provided with a suitable angle-iron 6 adapted to provide an extended bearing surface for the sides and ends of the perforated board and cloth, the two semicylindrical shells being held together and suitably spaced apart by means of I-beams 7 positioned adjacent the sides and also on each side of the center, the I-beams being held in position through suitable bolts and nuts 8 in engagement with the parts.

Referring particularly to Fig. 2 it will be noted that the perforated boards 3 are separated from each other a suitable distance and that between the boards partitions 9 are provided whereby a plurality of chambers are formed, each chamber communicating with substantially one-half of one perforated board. The ends of the filter adjacent these chambers are open so that the liquid issuing through the openings in the boards may have an outlet.

Extending between the central I-beams 7 is a hollow axle 10 which communicates with the interior of each half of the cylinder by means of a suitable opening terminating in a feed pan 11, the mixture of the pulp and water or other material being adapted to be entered into one end of the hollow axle and forced therethrough, being received in either half of the cylinder through the feed pan which communicates with the interior of the axle. Each of these feed pans comprises an end portion 12 adapted to be engaged in the hollow axle 10 in any suitable manner and held in position by suitable means, such as a ring 13, the upper end of the pan being enlarged whereby the material issuing therefrom may be more or less distributed in the filter. The axle 10 is designed to rotatably support the filter in suitable standards or uprights and to assist in turning the filter so as to bring either portion thereof into lowermost position, the exterior thereof is provided with suitable rings 14.

In order to break up or disintegrate the pulp or any other material which is forced into the filter I make use of suitable mechanisms positioned in each portion thereof and which comprise longitudinally extending shafts 15 mounted in suitable bearings 16, some of which are on the interior of the convex end 2, the others being exterior of the opposite convex end, leakage being prevented by means of suitable stuffing boxes or glands 17. Secured to the shafts at convenient points therealong are a plurality of blades 18 preferably arranged as shown in Fig. 1 and, in order that the shaft and blades may be conveniently turned, the outer ends of the shafts are squared as at 19.

In order to provide for the discharge of the pulp or the solid material after the liquid mixed therewith has been drawn off a suitable valve 20 may be positioned at opposite sides of the filter and communicating with each of the portions thereof, each valve being of any convenient design and being of a size convenient to pass the solid material.

One end of each portion of the filter when the same is used with compressed air is preferably provided with a suitable safety valve 21 of any suitable make-up and design, the purpose of which is to prevent bursting of the filter under the pressure applied; when used with compressed air or when used as a vacuum filter, one end of the axle 10 is preferably closed and the pressure or reducing apparatus is applied to the open end of the axle after the material has been passed therethrough, the pressure of the air forcing the liquid through the filter cloths 5 and through the perforations 4 in the corrugated boards 3; when a vacuum or pressure reducing outfit is used, the reduction of pressure between the interior of either portion of the filter and the atmosphere permits the liquid to more easily drain from the pulp or other material and pass into the compartments on each side of the partitions 9.

In using my device it is mounted in the position shown in Fig. 1, the pulp or other material being entered into the upper half thereof, and when this is accomplished the filter is turned about the axle until the other portion of the filter is brought into uppermost position, the material in the lower portion being disintegrated and broken up by means of the blades 18. The device is thus adapted for use continuously inasmuch as each portion thereof may be used alternately, thereby providing a convenient structure easily adapted for manual operation which may be used in places where power is not accessible.

Of course the size of the device and the particular form of the different elements entering therein will depend largely upon the use to which it is put, such changes being comprehended within the spirit of the appended claims.

Having thus described my invention, I claim as new, and desire to secure by Letters Patent:—

1. A filter made up of two similar members each substantially semi-cylindrical in outline, together with means for supporting them in position and spaced apart a suitable distance.

2. A filter made up of two similar portions, each substantially semi-cylindrical in construction, the said portions being suitably supported adjacent each other with a space between them, together with filtering devices carried by each portion adjacent the said space whereby material contained in either portion may be filtered into the said space.

3. A filter made up of two semi-cylindrical portions, one side of each being provided with a perforated board having a filtering cloth positioned thereover, the said portions being suitably held together and spaced apart, the said sides being adjacent the said space whereby, when material is entered into either portion the liquid therein may drain into the said space.

4. A filter made up of two portions each substantially semi-cylindrical in structure, one side of each being made up of a perforated board having a filtering cloth spread thereover, means for holding the two portions spaced apart a suitable distance with the said perforated sides adjacent each other, other means for rotatably supporting the filter in position, the said means also affording an inlet for material supplied to the filter.

5. A filter made up of two portions of substantially similar construction, one side of each portion being made up of a perforated board having a filtering cloth spread thereover, means for holding the two portions in operative position and spaced apart a suitable distance, the said perforated sides communicating with the space between the said portions, a shaft for rotatably supporting the filter, the shaft providing an inlet for material to either portion, together with means contained in each portion for disintegrating the material entered therein.

6. A filter made up of two portions of substantially the same construction, one side of each portion providing a filtering device, means comprising suitable spacing elements in engagement with the filtering side of each portion, whereby the two portions are separated a suitable distance with a space between them, means for securing the parts together, a hollow axle for rotatably supporting the filter, the axle affording an inlet whereby suitable material may be entered into either portion, together with a plurality of blades rotatably mounted in each portion for disintegrating the material entered therein, the said space between the filtering sides of the portions affording an outlet for the filtered substance.

7. A filter made up of two portions of substantially similar construction, one side of each portion providing a filtering device, means engaging each of the said portions for suitably spacing them a suitable distance apart whereby a space is provided between them, each of the said filtering sides communicating with the said space, means for rotatably supporting the filter in position, means within each portion comprising a plurality of revoluble blades whereby the material therein may be disintegrated, the liquid from the substance in either portion leaving the filter through the said spaces, there being suitable outlets whereby the residue in each portion of the filter may be withdrawn.

8. A filter made up of two portions of substantially similar shape and construction, one side of each of the said portions providing a filtering surface, means whereby the two portions may be held together and spaced apart a suitable distance, the said filtering sides of each of the portions forming the side walls of the said space, a hollow axle for rotatably supporting the filter, the interior of the axle communicating with each of the portions, a longitudinally extending shaft in each portion, a plurality of blades on each shaft for disintegrating the material contained therein, means comprising suitable valves carried by each portion whereby the residue of the filtering operation may be withdrawn, the said space between the filtering sides affording an outlet for the liquid filtered.

In testimony whereof I have signed my name to this specification in the presence of two subscribing witnesses.

CHARLES EDWIN BALLOW.

Witnesses:
WILL J. FLEVEL,
J. M. WILSON.

Copies of this patent may be obtained for five cents each, by addressing the " Commissioner of Patents, Washington, D. C."